(No Model.)
W. O. SILVEY.
HARROW ATTACHMENT FOR PLOWS.
No. 474,269. Patented May 3, 1892.
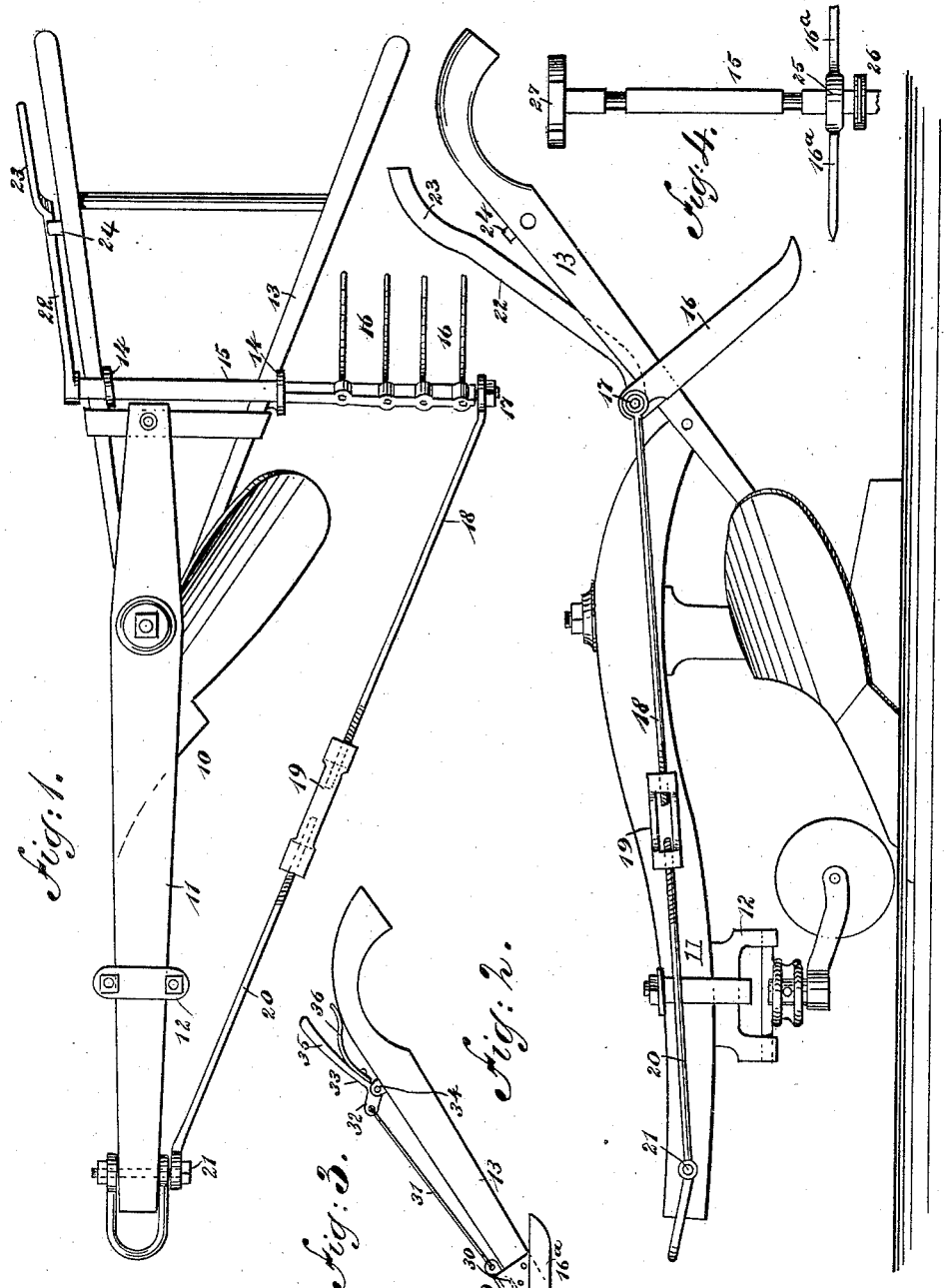
WITNESSES:
Chas. Nida.
C. Sedgwick.
INVENTOR:
W. O. Silvey
BY Munn & Co.
ATTORNEYS

UNITED STATES PATENT OFFICE.

WILLIAM O. SILVEY, OF MIDDLEPORT, OHIO.

HARROW ATTACHMENT FOR PLOWS.

SPECIFICATION forming part of Letters Patent No. 474,269, dated May 3, 1892.

Application filed December 29, 1891. Serial No. 416,454. (No model.)

*To all whom it may concern:*

Be it known that I, WILLIAM O. SILVEY, of Middleport, in the county of Meigs and State of Ohio, have invented a new and Improved Harrowing Attachment for Plows, of which the following is a full, clear, and exact description.

My invention relates to improvements in plows and harrows; and the object of my invention is to produce a strong, simple, and positive working attachment which may be easily applied to any variety of plow, which will thoroughly pulverize the earth turned up by the plow, thus saving a separate harrowing, and which may be turned up out of the way when desired.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a plan view of a plow provided with my invention. Fig. 2 is a side elevation of the same. Fig. 3 is a broken side elevation of a modified form of the device in which rotary blades are used, and Fig. 4 is a broken detail plan of the same.

The plow 10 is of the common sort and may be of any approved kind, the plow having the usual beam 11, the ordinary colter attachment 12, and the handles 13, which are secured to the beam. The handles are provided near their lower ends with supports 14, in which an axle 15 is held to turn, and this axle projects outward beyond the mold-board of the plow and carries a plurality of parallel blades 16, which are preferably curved rearward at the lower ends, but may be of any approved shape. The outer end of the axle is pivoted, as shown at 17, to a brace-rod 18, which extends diagonally forward and screws into a turn-buckle 19, which is also screwed to a similar bolt 20, which is secured at its front end to the clevis-bolt 21 of the plow. It will thus be seen that the rods or bolts 18 and 20 serve as a brace, and by means of the turn-buckle they may be easily adjusted to the proper tension. One end of the axle 15 is secured to a lever 22, which extends upward nearly parallel with the handles 13 and is bent outward slightly near its upper end, as shown at 23, so that it may be conveniently grasped by the hand of the man holding the plow. On the handle 13, adjacent to the lever 22, is a catch 24, and by placing the lever beneath the catch it cannot be moved forward, and the catch will prevent the blades from being forced backward when they come in contact with the ground; but by springing the lever out slightly, so as to enable it to pass above the catch, it may be thrown forward, so as to raise the blades 16 and enable them to clear any obstruction, such as a rock or stump. The axle 15 should be of such a length that the blades 16 will come a little behind and to one side of the mold-board of the plow, and consequently they will be buried in the furrow and will cut up the soil finely, having the same effect as the usual harrow.

It will be understood that this attachment may be applied to any kind of a plow, and it will be seen, too, that the blades will work the same whether they are supported on the plow-handles, the plow-beam, the plowshare, or any convenient part of the plow.

In Figs. 3 and 4 I have shown a modified form of the apparatus, and in this case the axle 15 is held to revolve in its hangers or supports 14 and is provided with radially-extending blades 16ª, which have suitable hubs 25, adapted to be secured to the axle, and the blades are prevented from slipping too far on the axle by collars 26. It will be seen that the movement of the plow will cause the blades to turn; but they are prevented from turning, except when necessary, by the following mechanism: On one end of the axle 15 is a disk 27, having a series of notches 28 therein, which notches are adapted to be engaged by a latch 29, which is held to slide in a keeper 30 on one of the plow-handles, and which connects by a rod 31 with the short arm 32 of a lever 33, which is pivoted in ears 34 near the top of the plow-handle, and the upper portion of the lever terminates in a handle 35, which is normally pressed upward by a spring 36 and which will thus normally hold the latch 29 in engagement with the disk 27, and the lower set of blades 16ª will operate to pulverize the soil; but if an obstruction is to be passed or the soil is not to be finely pulverized the latch may be withdrawn from the disk by means of the elbow-lever 33, and the blades 16ª will thus revolve freely with the axle 15.

Having thus fully described my invention, I claim as new and desire to secure by Letters Patent—

1. The combination, with a plow having bearings on its handles, of a shaft journaled in the bearings and projecting outward in rear of and beyond the mold-board, a series of knives carried by the shaft, an operating handle or lever connected with the shaft and extending adjacent to the hand-grasping portion of one handle, and a rigid brace-rod extending from the forward end of the plow-beam and having a bearing at its rear end in which the outer end of the shaft is journaled, substantially as set forth.

2. The combination, with a plow, of a transverse shaft journaled thereon in rear of the mold-board and provided with a lever 22, extending upward alongside of one plow-handle, a lug or catch on the said plow-handle to engage said lever and lock it, and a series of knives on the outer end of the said shaft, substantially as set forth.

WILLIAM O. SILVEY.

Witnesses:
JAMES H. RALSTON,
WILLIAM DAWSON.